United States Patent
Romzek

(10) Patent No.: US 11,634,108 B2
(45) Date of Patent: Apr. 25, 2023

(54) CHAIN CLEANING DEVICE

(71) Applicant: Chadwick Irvin Romzek, Neenah, WI (US)

(72) Inventor: Chadwick Irvin Romzek, Neenah, WI (US)

( * ) Notice: Subject to any disclaimer, the term of this patent is extended or adjusted under 35 U.S.C. 154(b) by 130 days.

(21) Appl. No.: 17/240,864

(22) Filed: Apr. 26, 2021

(65) Prior Publication Data
US 2021/0339715 A1    Nov. 4, 2021

Related U.S. Application Data

(60) Provisional application No. 63/018,336, filed on Apr. 30, 2020.

(51) Int. Cl.
*B60S 3/04* (2006.01)
*B62J 50/16* (2020.01)
*B08B 5/02* (2006.01)

(52) U.S. Cl.
CPC ............. *B60S 3/041* (2013.01); *B08B 5/023* (2013.01); *B60S 3/044* (2013.01); *B62J 50/16* (2020.02)

(58) Field of Classification Search
CPC .............. B08B 5/02; B08B 5/023; B60S 3/04
See application file for complete search history.

(56) References Cited

U.S. PATENT DOCUMENTS

| | | | |
|---|---|---|---|
| 1,158,271 A * | 10/1915 | Penzer | F02C 5/06 60/39.15 |
| 4,148,109 A | 4/1979 | Morley | |
| 4,578,120 A * | 3/1986 | Chiarella | B62J 31/00 134/40 |
| 4,783,186 A | 11/1988 | Manning | |
| 5,069,470 A * | 12/1991 | Spencer | B62J 31/00 280/288.4 |
| 5,213,180 A | 5/1993 | Masonek | |
| 5,269,614 A | 12/1993 | Taylor | |
| 6,257,369 B1 | 7/2001 | Pesl | |
| 6,942,409 B2 | 9/2005 | Barbieri | |
| 7,194,334 B2 | 3/2007 | Laski | |
| 8,511,436 B2 | 8/2013 | Feldstein | |
| 9,079,720 B1 | 7/2015 | Schmidt | |
| 2009/0165229 A1* | 7/2009 | Yu | B62J 31/00 15/160 |

FOREIGN PATENT DOCUMENTS

WO    WO1999012666 A    3/1999

* cited by examiner

*Primary Examiner* — Michael D Jennings
(74) *Attorney, Agent, or Firm* — Jeffrey S. Sokol

(57) ABSTRACT

The present invention is a chain cleaning device with a track that guides a chain through a cleaning chamber. The cleaning chamber forms air flow pathways along the sides of the chain. Discharge ports in the chamber ceiling direct a high velocity working air flow spanning the width of the chamber at the upper surfaces of the chain to generate high velocity swirling air flows that progress through the interior openings of the chain and through the pathways along the outer sides of the chain. The compact nature of the cleaning chamber and the close proximity of its walls to the chain maintain the high velocity working and swirling air flows against the various differently oriented surfaces of the chain to remove dirt, grease, grit and grime from the multi-surface chain, including the nooks and crannies where chain plates, pins and rollers come together.

29 Claims, 12 Drawing Sheets

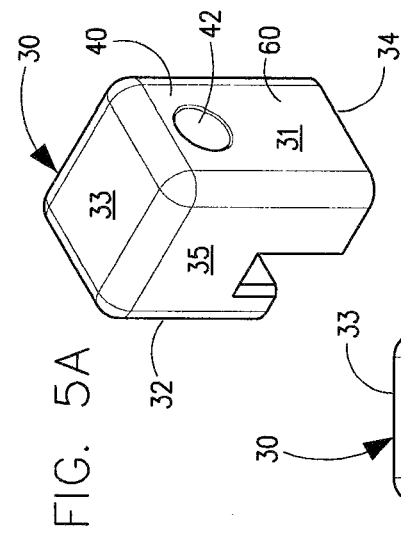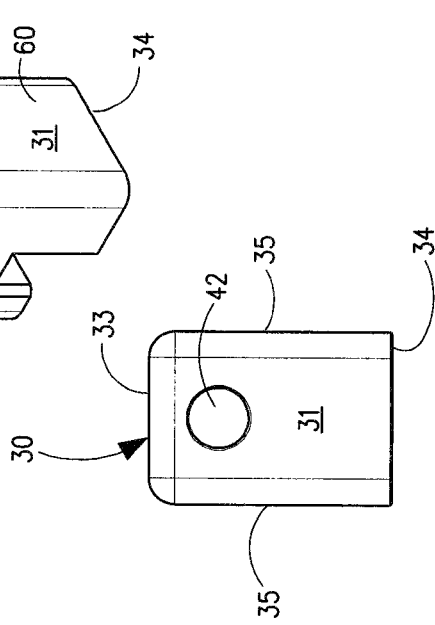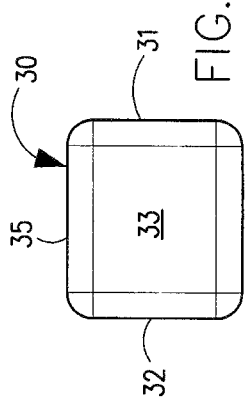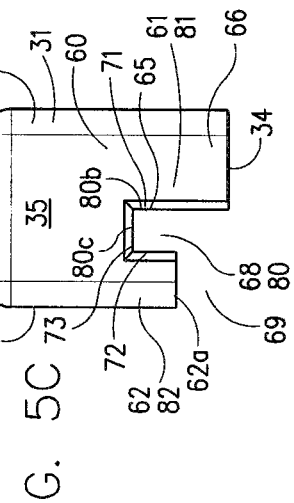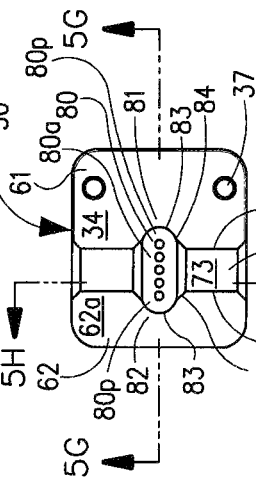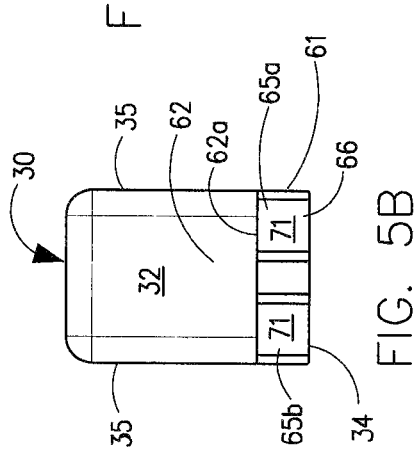

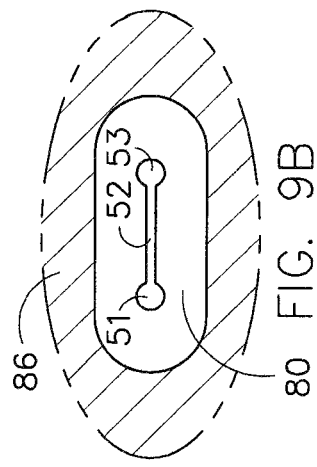 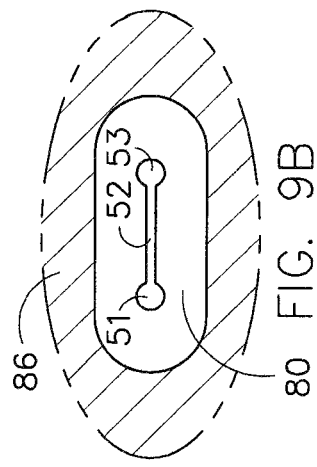 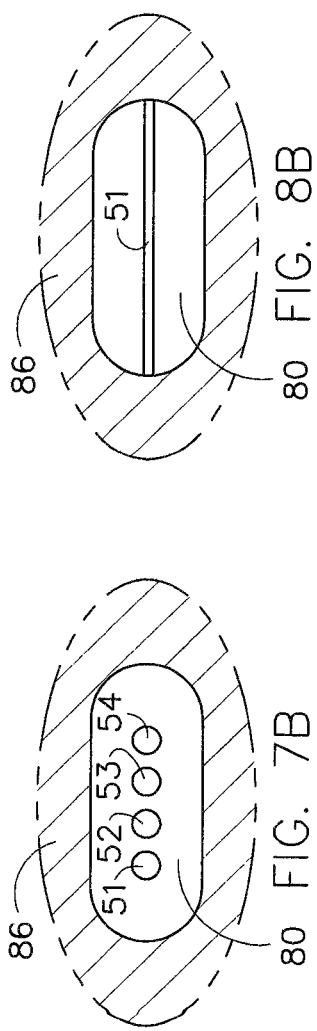
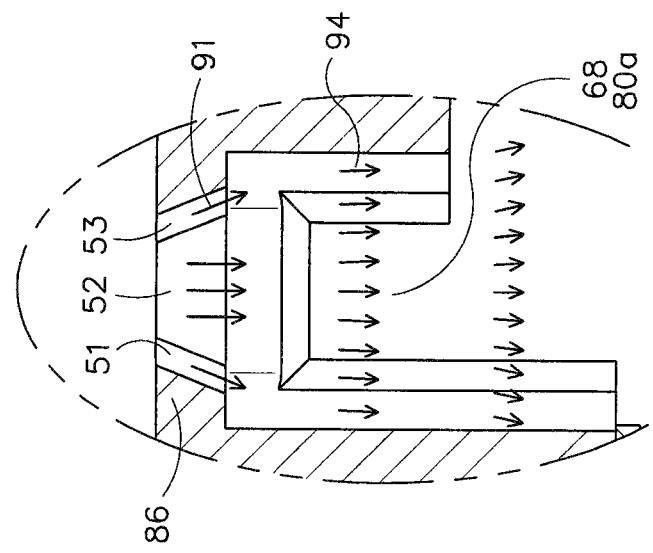 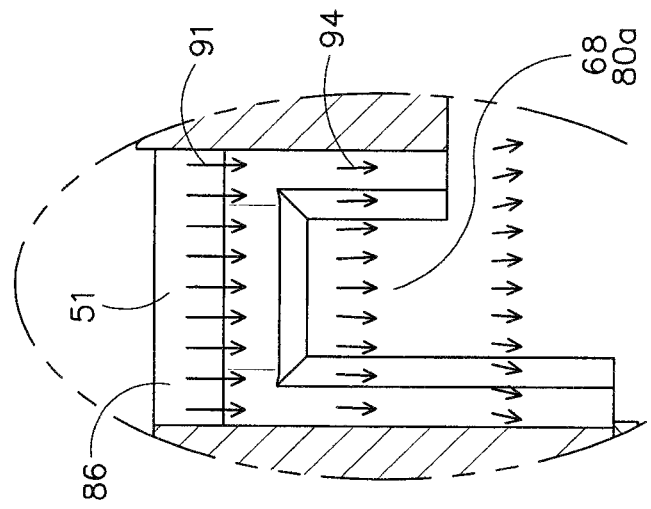 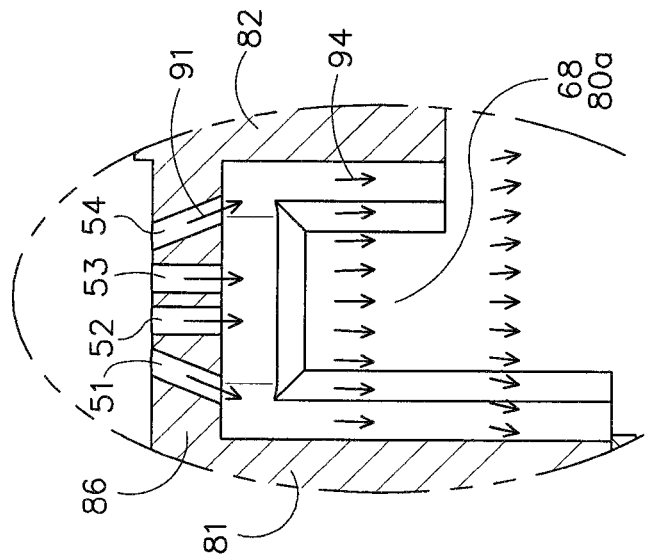

CHAIN CLEANING DEVICE

TECHNICAL FIELD OF THE INVENTION

This invention relates to a chain cleaning device with a track to align a moving chain with a compact cleaning compartment with lateral air flow pathways along the outer side surfaces of the chain and directing a high velocity air flow across the top surface of the chain to generate a confined high velocity working and swirling air flows through and around the chain to remove dirt, grease, grit and grime from the various differently oriented surfaces of the chain.

BACKGROUND OF THE INVENTION

Bicycles transfer rider power to wheel power via foot pedals, sprockets and a drive chain. These drive chains perform best when clean and properly lubricated. The cleaner the chain, the more effective the lubricant and the more efficiently the chain transfers power. Efficient power output is desirable for recreational bicycling and critical for racing. Yet, recreational bicycling and bicycle racing take place over a wide variety of terrains, such as dirt, gravel and paved roads that often traverse patches of mud, standing water, sand, leaves, grass clippings and other various types of debris. This real world environment is kicked up by the wheels onto the oiled or greased chain, causing dirt, grit and grime to accumulate on the many intricate moving parts of the chain. The dirt, grit and grime cause friction, results in wear and tear on the chain and reduces rider power output. Accordingly, maintaining the bicycle chain in a clean and properly lubricated condition is important before embarking on a long recreational ride or bicycle race.

Using solvents and a brush or towel to clean a bicycle chain is well known. Solvent based bicycle chain cleaning devices are also well known. Examples of chain cleaning devices that use solvents and brushes are sold by Park Tool, Inc., and Muc-Off, Inc. The chain passes through a solvent solution to break down the dirt and grime, which is then more readily brushed away by the device. Devices that use brushes to apply cleaning or lubricating solutions to a chain are disclosed in U.S. Pat. No. 4,783,186 to Manning, U.S. Pat. No. 5,213,180 to Masonek, U.S. Pat. No. 6,257,369 to Pesl and U.S. Pat. No. 6,942,409 to Barbieri. Unfortunately, these devices have proven less than ideal. While they clean much of the dirt and grime, these devices do not fully engage the entire chain and leave smaller particles that can inhibit the optimal performance of the chain and reduce its useful life. Using more aggressive or harsh solvents lead to alternate problems, as they can actually seep into and damage the internal lubrication of the chain links. In some situations, the solvent is also allowed to drip off the chain and onto the floor and surrounding objects.

Yet, harsh solvents are toxic to people, animals and the environment. Common methods to dry the solvents from the chain include drying the chain with a towel, allowing the chain to dry in the sun or air dry, and manually blowing air over the chain. Blowing toxic solvents around in a work area is a health hazard, particularly when the work area is confined. A cleaner and lubrication apparatus that applies a solvent to the chain and then uses a compressed air supply and air knifes blow off excess solvent so that the chain exits dry and does not drip solvent onto the ground is shown in U.S. Pat. No. 8,511,436 to Feldstein. The Feldstein device does not provide structure around the chain or produce air forces acting on the chain to clean a multi-surface chain. Although the air is said to be high velocity air, no discussion of the pressure, volumetric flow rate, air speed or orifice size is provided. In fact, given the pool of solvent below the chain, the speed of the air directed at the chain and pool would seem relatively low. Spattering the pool of solvent would defeat the purpose of drying the chain. And, when no solvent is in the housing and a lubricated chain passes through it, the air knifes leave a desired thin coating on the chain. Similarly, spraying the liquid solvent on the chain with force will push solvent into spaces between the rollers, bushings and connecting pins, which will lead to increased wear and tear on the chain.

Using compressed air to blow dirt and debris from a chain is also well known, but there are several problems with this manner of cleaning. A compressor supplies pressurized air via a flexible hose to a nozzle that must be manipulated by hand to direct its flow of air at the chain. Yet, cleaning dirt, grit and grime from a metal surface with pressurized air is more effective when the nozzle is close to the surface being cleaned and the air strikes the surface at a high degree of angle. The closer to an impact angle of ninety degree (90°) the more effectively and quickly the dirt, grit and grime are removed. Maintaining the nozzle in alignment with and close to the chain is awkward. When the chain is on a bicycle, one hand holds the nozzle and the other rotates the peddle to move the chain past the nozzle. Yet, chains, such as bicycle chains, are formed by a series of metal links with side plates joined at their ends by connecting pins and rollers with bushings. These components have surfaces that face a variety of directions, and their joints form a variety of nooks and crannies in which the grit and grime gets lodged, which make cleaning the chain more difficult. To fully clean a multi-surface chain, the compressor nozzle has to be positioned in a wide variety of directions at the chain while remaining in close proximity to the chain and negotiating around the frame and components of the bicycle. This is monotonous and time consuming, and invariably leads to missing many surfaces. Dirt, grit and grime are also sprayed all over the work area and other parts of the bicycle.

The present invention is intended to solve these and other problems.

BRIEF DESCRIPTION OF THE INVENTION

The present invention pertains to a bicycle chain cleaning device with a track that guides a chain through a cleaning chamber. The cleaning chamber forms air flow pathways that closely surround the top and sides of the chain. The device is used with a source of pressurized air. Air discharge ports in the chamber ceiling direct a high velocity working air flow spanning the width of the chamber at the top surfaces of the chain to generate high velocity swirling air flows that progress through and around the chain. The compact nature of the cleaning chamber and the close proximity of its walls to the chain maintain the high velocity swirling air flow against the various differently oriented surfaces of the chain to remove dirt, grit and grime from the multi-surface chain, including the nooks and crannies where plates, pins and rollers come together.

An advantage of the present chain cleaning device is its ability to clean a multi-surface chain. The working air stream from the discharge ports strike the upwardly facing surfaces of chain plates, rollers and pins at a high degree of angle of about a ninety degree (90°) to effectively dislodge and remove dirt, grit and grime from these surfaces. The portion of the working air stream that deflects off the top surfaces of the chain generate turbulent or swirling air streams that redirect high velocity air flows back at the chain from a multitude of directions. The limited volume of the cleaning chamber and its pathways keeps the swirling air flows moving at a high velocity as they progress along the inside and around the sides of the chain to impact its many differently angled and oriented surfaces from many directions. The swirling air flow does not just blow by the chain surfaces, but strikes these surfaces at high degrees of angle to quickly and effectively clean dirt, grit and grime from the multi-surface chain, including the nooks and crannies and chain surfaces that do not face the discharge ports.

Another advantage of the present chain cleaning device is the U-shaped pathway formed by the cleaning chamber around three side of the perimeter of the chain. This horseshoe shaped or U-shaped pathway allows a constant flow of the high velocity air streams from the discharge ports when either the open or closed profile of the chain is aligned under the ports. The chamber ceiling is recessed from the top surface of the chain to create a pathway above the chain spanning from the front chamber wall to the rear chamber wall. The ceiling path flows into and merges with both the front and rear chamber pathways extending along the outside side surfaces of the chain. This horseshoe shaped pathway allows the high velocity working air flow from the discharge ports to flow into the side pathways when the chain restricts or blocks the flow of air through the inside of the chain. When a chain link is aligned in the chamber so that the discharge ports are directly over the side plates and the open interior is between them, much of the air flow progresses through the inside of the chain. When the ends of two adjacent chain links are aligned in the chamber so that the discharge ports are over the chain plates, rollers and pins, less air flow passes through the inside of the chain, and more air flow passes through the side pathways so that the volumetric air flow through the discharge ports remains relatively constant. The increased amount of or surge in high velocity working and turbulent air flow through the side pathways improve the ability of the device to efficiently clean the outside surfaces of the chain.

A further advantage of the present chain cleaning device is its effectiveness in cleaning the outside surfaces of the chain. The front and rear walls of the cleaning chamber are offset from the side walls of the track, and one outer discharge port is aligned directly over each side pathway. Directing a high velocity air stream directly into each side pathway improves the air speed and amount of air flow through the side pathways to more effectively remove dirt, grit and grim from the side surfaces of the chain. In addition, when the closed chain profile (plates, roller and pin) is aligned directly under the central discharge ports, the working air flow from these central ports strikes the upwardly facing surfaces of the plates roller and pin to generate a larger amount of deflected, redirected and turbulent or swirling high velocity air flows that enter the side pathways along with the high velocity working air flows from side ports to create a pulsing surge of air flow through the side pathways to even more effectively remove dirt, grease, grit and grime from the side surfaces of the chain.

A still further advantage of the present chain cleaning device is its ability to fluctuate between pulsating air flows and more steady state air flows inside the cleaning chamber. When the discharge ports are aligned over a chain link opening, the chain profile for its upwardly facing surfaces is smaller, so that the air flow pattern along the interior and outer chain surfaces is believed to be more dominated by its downward conical air flows, but still include turbulent swirling air flows to a notable degree. When the discharge ports are aligned directly over a roller connecting two links, the chain profile for its upwardly facing surfaces is larger, so that the air flow pattern is believed to be more dominated by the turbulent swirling air flow. As each link, passes by the discharge ports, the airflow pattern fluctuates. Turning the bicycle pedal slowly, moderately or quickly alters the air flow pattern in the cleaning chamber. A slow moving chain results in a pulsating air flow pattern fluctuating between more and less turbulent swirling air flows. A fast moving chain is believed to generate a more constant or steady state high velocity swirling air flow. A fast moving chain also increases the cleaning power of the device on the leading surfaces of the chain as it moves through the cleaning chamber.

A still further advantage of the present chain cleaning device is its ease of use. The chain cleaning device is held in one hand by a worker to properly space the chain from its discharge ports and align the chain with the high velocity working air flow of the device. The chain is positioned in and guided by the three sided track with the upper surface of the chain abutting the upper surface or base wall of the track to properly align the chain a desired distance from the discharge ports and position the pathways along the outer side surfaces of the chain. The other hand is free to rotate the bicycle peddle and move the chain along a path of travel through the track and cleaning chamber at a desired rate of speed. The speed of the chain is increased or decreased to increase or decrease the amount of time a link is in the cleaning chamber, and to generate the desired pulsating or steady state air flow. In addition, because the device uses no liquids or solvents during its operation, the device can be used when the bicycle is upright or laying down. The device can also be rotated 90 or 180 degrees so that its discharge ports are aimed at the top, sides or bottom of the chain.

A still further advantage of the present chain cleaning device is that it can be used after applying and removing a mild degreaser. The chain is first soaked in the mild degreaser, such as a citrus degreaser or simple dish washing soap, which loosens the hold of the dirt, grease, grit and grime on the chain, but does not strip away any internal lubrication of the chain link components. A brush or towel is used to remove thicker and heavier amounts of dirt, grease, grit and grime from the chain. Then, the present chain cleaning device is used to remove the remaining particles of dirt, grease, grit and grime and blow off any remaining degreasing agent to fully clean the chain. The need for harsh and toxic solvents is avoided, the internal lubrication of chain link components is maintained, and the useful life of the chain is improved.

A still further advantage of the present chain cleaning device is that it collects debris during the cleaning process. The air flow from the device is directed into a container positioned below the cleaning chamber. Dirt, grease, grit and grime is not sprayed all around the work area and all over other parts of the bicycle.

A still further advantage of the present chain cleaning device is its safety features. The container prevents the working air flow from being directed directly at a person. Dirt, grease, grit and grim is not sprayed around the work area or into the face of the worker. In addition, the chain cleaning device does not blow harsh toxic solvent vapor around a room to be breathed by the user and others in the room. The mild solvent is applied and removed prior to the use of the present invention, to maintain a safe, healthy work environment. The block design of the device also allows a person to easily grip the device during use, to help avoid worker contact with the moving chain, and help prevent a finger or hand from being pinched between the device and the moving chain.

A still further advantage of the present chain cleaning device is its manufacturing efficiency when the main body is formed from a single piece of metal or plastic. When the main body is metal, it is formed from a block shaped piece. The air intake channel is drilled into the front side of the upper portion of the block, and its outer end is threaded to receive the air intake connector. The track is formed by cutting a rectangular opening completely through the lower portion of the main body to form the front, rear and upper track walls. Container securement holes are drilled into the bottom surface of the front wall, and the lower end of the rear wall is cut away to form the chain receiving zone and give the track a square shaped profile. The cleaning opening is then formed into the lower portion by routing out the bottom of the block to the desired depth. Discharge openings are then drilled through the chamber ceiling to the intake chamber. The outer and inner track edges are chamfered, and the outer edges and corners of the block are rounded. This main body is readily machined, and is even formable from a 3D printer.

Other aspects and advantages of the invention will become apparent upon making reference to the specification, claims and drawings.

BRIEF DESCRIPTION OF THE DRAWINGS

FIG. 5A is a perspective view of the air distribution and chain aligning block.

FIG. 5B is a rear view of the air distribution and chain aligning block.

FIG. 5C is a side view of the air distribution and chain aligning block.

FIG. 5D is a front view of the air distribution and chain aligning block.

FIG. 5E is a top view of the air distribution and chain aligning block.

FIG. 5F is a bottom view of the air distribution and chain aligning block.

FIG. 7A is a partial side sectional view of an embodiment of the air distribution block with four discharge ports, where the outer two ports are angled to direct more air flow toward the front and rear walls of the cleaning chamber.

FIG. 7B is a top view showing the four discharge port embodiment of FIG. 7A.

FIG. 8A is a partial side sectional view of an embodiment of the air distribution block with a single discharge port in the form of a narrow slit spanning the width of the cleaning chamber.

FIG. 8B is a top view showing the single slit discharge port embodiment of FIG. 8A.

FIG. 9A is a partial side sectional view of an embodiment of the air distribution block with a combination of two angled discharge ports directing more air flow toward the front and rear walls of the cleaning chamber and a central expanding slit discharge port directing air flow toward the middle of the cleaning chamber.

FIG. 9B is a top view showing the angled and slit discharge ports of FIG. 9A.

DESCRIPTION OF THE PREFERRED EMBODIMENT

While this invention is susceptible of embodiments in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

Figure 2:
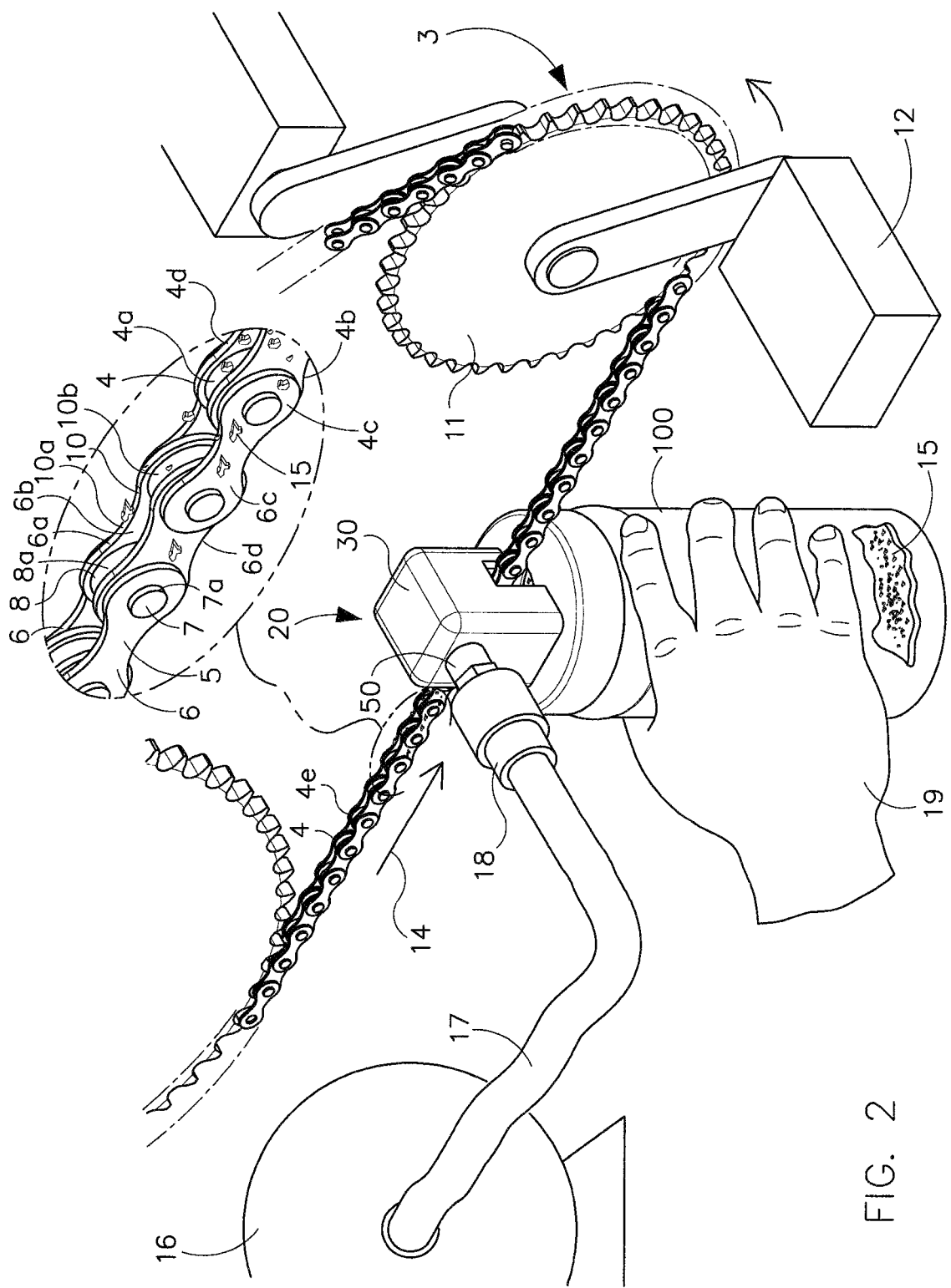
FIG. 2 is a perspective view of the chain cleaning device held by a worker and aligned with the top of the taut, multi-surface bicycle chain engaging and riding along the track, and with a portion of its container cut away to show the dirt, grit and grim removed from the chain.

Bicycles 3 have a drive chain 4 with a top and bottom or crosswise chain surfaces 4a and 4b, opposed lateral side chain surfaces 4c and a chain perimeter 4d as best shown in FIG. 2. The looped chain 4 is formed by a series of interconnected like-shaped links 5. Each link 5 includes two thin, parallel, side plates 6 joined at their ends by perpendicular connecting pins 7 and spaced apart by rollers 8. Bushings (not shown) are between the co-linear pins 7 and rollers 8. The side plates 6 are free to rotate about the pins 7 to give the chain 4 a great amount of flexibility, and allow the chain to loop around a set of sprockets 11. The chain 4 has generally linear portions 4e between the sprockets 11. Each side plate 6 has a top surface 6a, inner and outer side plate surfaces 6b and 6c, bottom surface 6d and rounded end surfaces 6e. The pins 7 and rollers 8 have a round outer surface 7a and 8a. Between the plates 6 and rollers 8 are openings 9 for receiving the teeth of the sprocket 11.

Figure 10A:
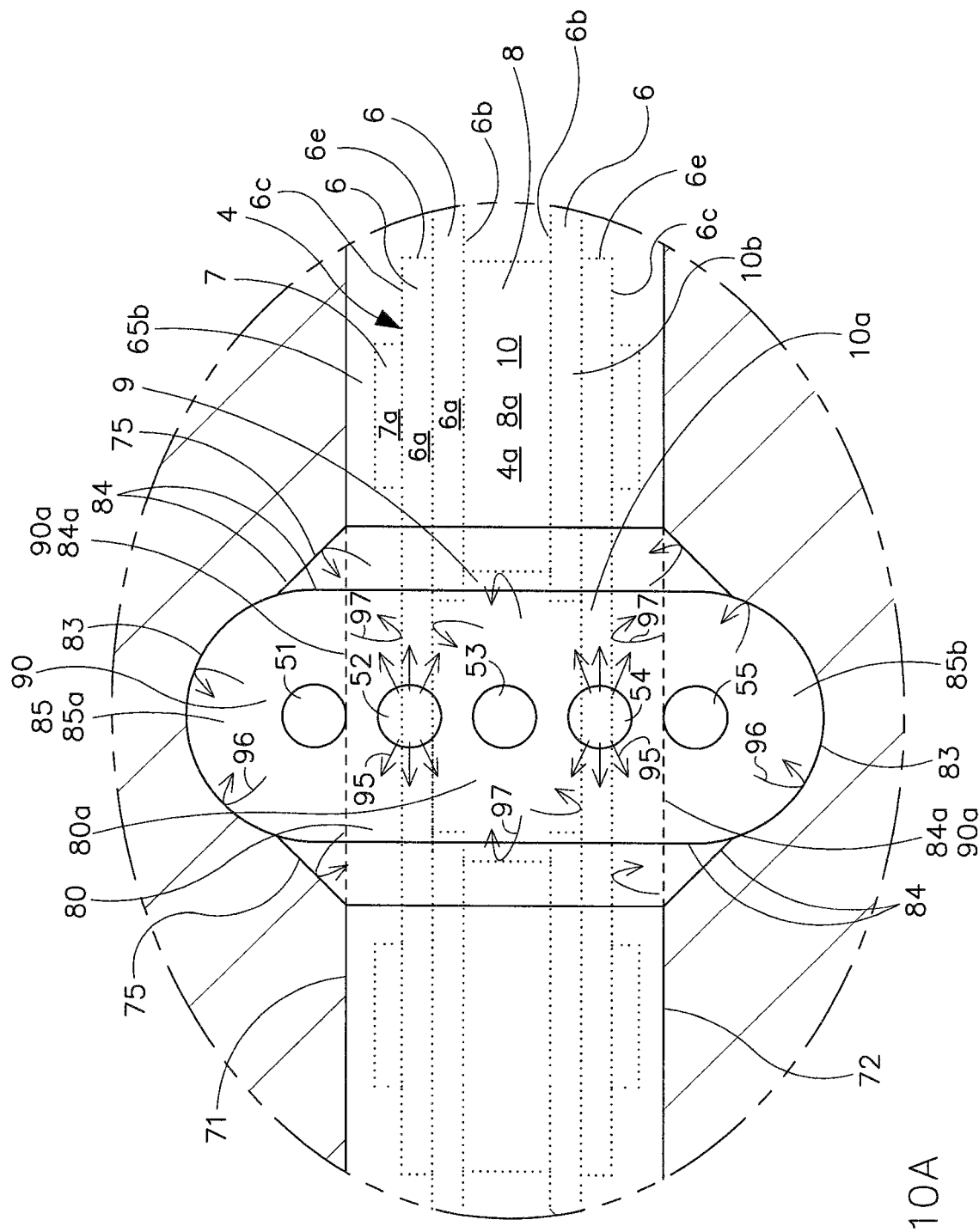
FIG. 10A is a top sectional view along line 10A-10A of FIG. 6 with the chain moving through the cleaning chamber and the discharge ports aligned over the plates and open interior of the chain (open profile) to direct the working air flow into the upwardly facing surfaces of the chain, and showing the deflected air stream moving outwardly toward other surfaces of the chain and the front, rear and side walls of the cleaning chamber, with the redirected air flows being directed back to strike other surfaces of the chain from a multitude of directions.
Figure 10B:
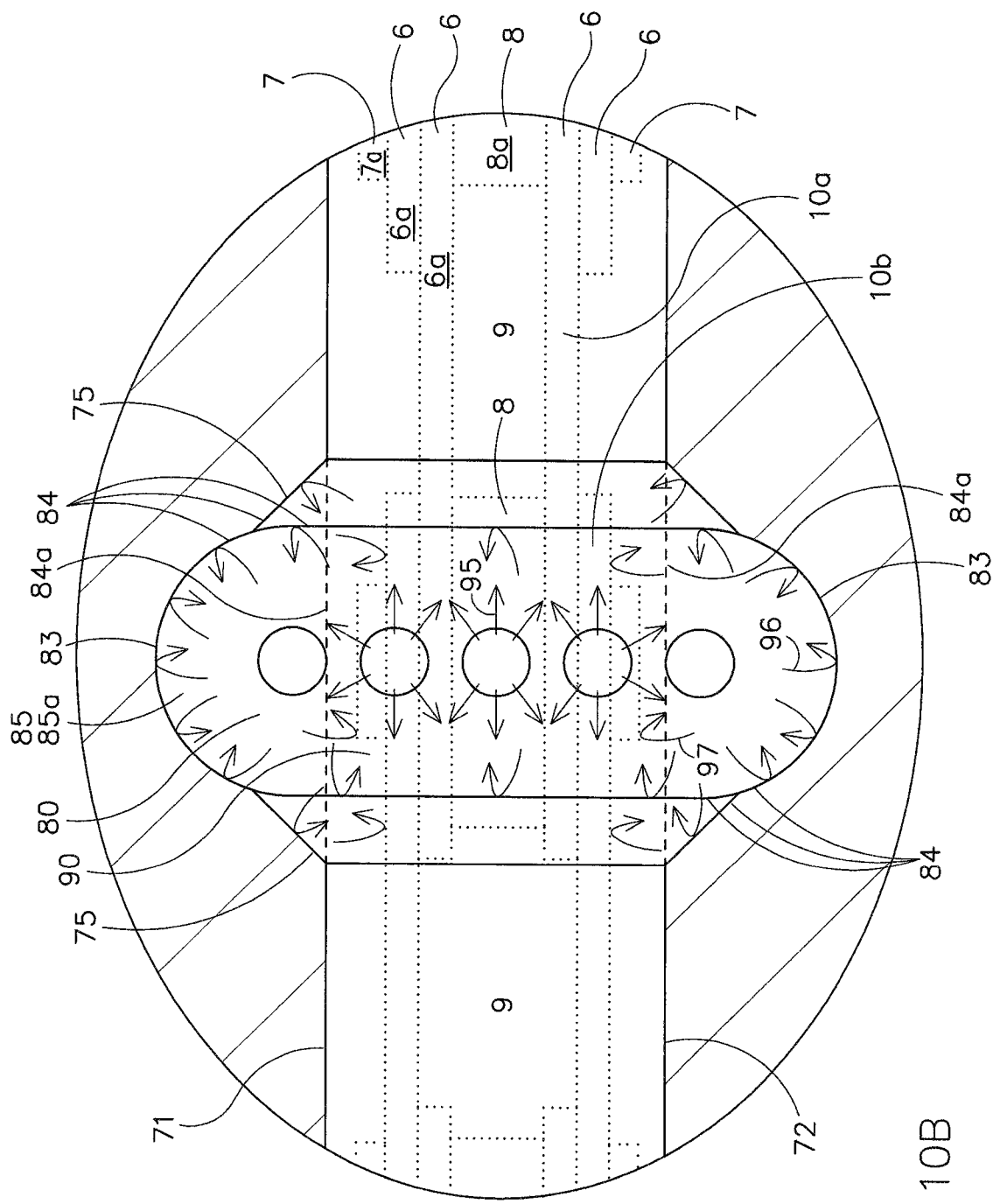
FIG. 10B is a top sectional view along line 10B-10B of FIG. 6 with the chain moving through the cleaning chamber and the discharge ports aligned over the plates, pin and roller of the chain (closed profile) to direct the working air flow into the upwardly facing surfaces of the chain, and showing the deflected air stream moving outwardly toward other surfaces of the chain and the front, rear and side walls of the cleaning chamber, with the redirected air flows being directed back to strike other surfaces of the chain from a multitude of directions.

When the chain 4 is viewed from above, its top or crosswise chain surface 4a and its upwardly facing chain surfaces 10 have intermittent openings 9 and certain repeating profiles 10a and 10b. In the portions of the chain 4 formed by two adjacent links 5 joined by their side plates 6 and a shared pin 7 and roller 8, a larger or more closed profile 10b is formed spanning the width of the chain 4 as seen in FIG. 10A. In the portion of the chain 4 formed by the middle of one link 5, a smaller or more open profile 10a is formed by the upper surfaces 6a of the single set of side plates 6 and the open chain interior 9 as seen in FIG. 10B. The chain 4 is looped around the spaced apart sprockets 11, with linear portions 4e between the sprockets. Rotating the foot pedal 12 turns the drive sprocket 11, which in turn moves the chain 4 along a linear path of travel 14 between the sprockets 11.

Bicycle chains 4 typically have a height of about 5/16 of an inch (0.31 inch, 8 mm). The width of the chain 4 varies. The chain 4 for an eight speed bike typically has a width of about 9/32 of an inch (0.28 inch, 7.1 mm). The chain 4 for a twelve speed bike typically has a width of about 13/64 of an inch (0.21 inch, 5.25 mm). The length of each link 5 in the chain is typically about ½ inch (0.5 inch, 12.7 mm). The rollers 8 have a diameter of about ⅛ inch (0.125 inch, 3.2 mm). The pins 7 are a bit longer than and pass through the hollow tubular rollers 8. Some bicycle chains 4 have an internal lubricant to facilitate movement between the pins 7, rollers 8 and any bushings. During use, the lubricated chain 4 picks up dirt and debris from the ground and environment to contaminate the lubricant. The dirt, grease, grit and grime 15 needs to be removed so that a clean layer of lubricant can be applied.

Figure 1:
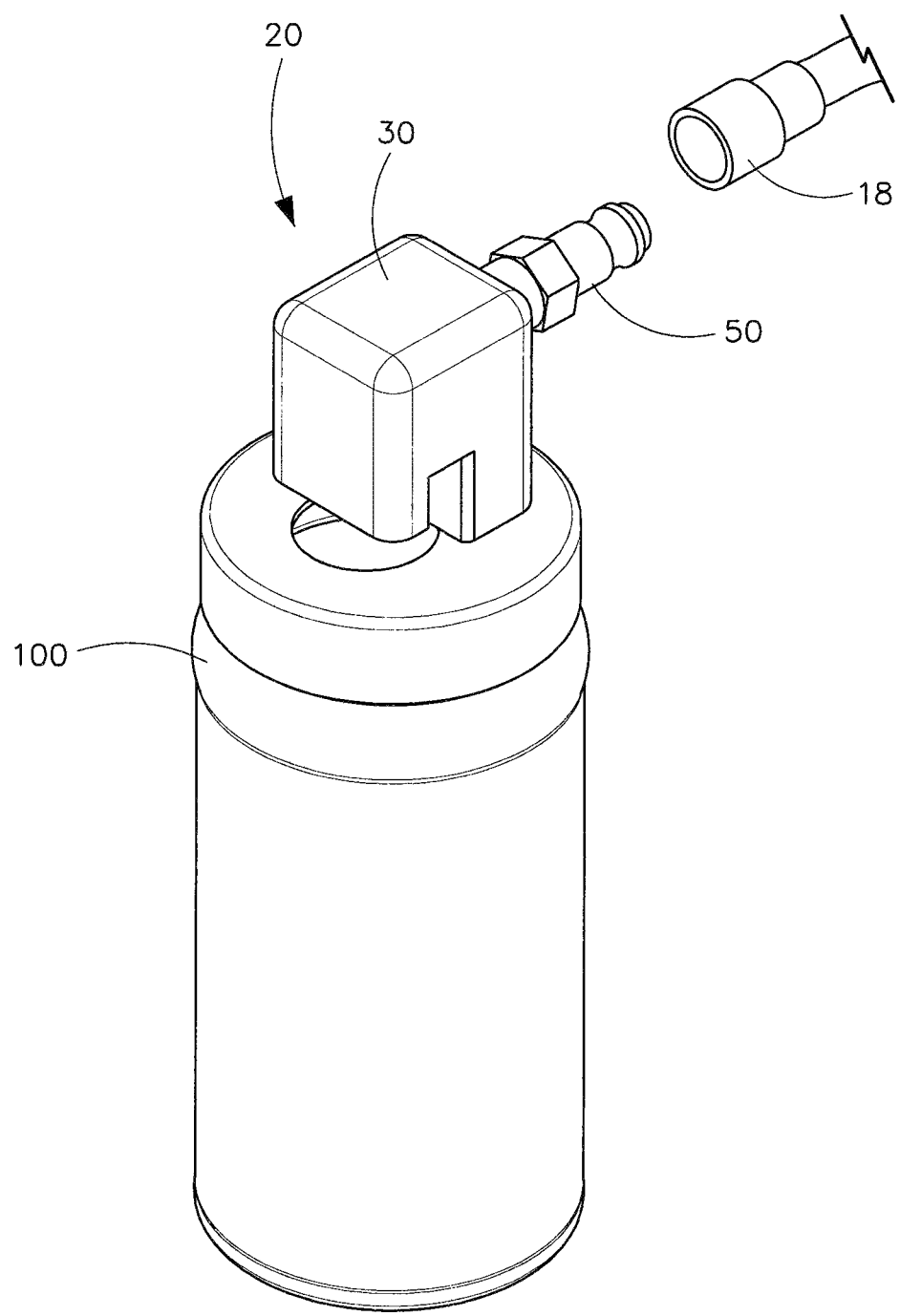
FIG. 1 is a perspective view of a preferred embodiment of the chain cleaning device ready for hooking up to the flexible hose of a compressor, with its air distribution block having a hook shaped portion that forms a chain aligning track to surround three sides of a chain, and with the block or main body joined to an air supply intake connector and discharge container.

The present invention is used in combination with a source of pressurized air or gas, such as a conventional air compressor 16 with a flexible supply hose 17 and snap-on connector 18. The chain cleaning device is generally shown as reference number 20 in FIGS. 1 and 2. The device 20 includes an air distribution block or main body 30, an air intake connector 50 and a container 100 for collecting the dirt, grit and grim 15 cleaned from the bicycle chain 4. The compact and light-weight device 20 is easily held in one hand 19 by a person during use, and readily manipulated to negotiate around the frame and other components of the bicycle 3 when cleaning the chain 4. While the cleaning device 20 is shown and described as cleaning a bicycle chain 4, the broad aspects of the invention apply to cleaning a wide variety of chains.

When machined from an integral piece of metal, the main body 30 preferably has a generally rectangular or block-like shape as shown in FIGS. 3-5H. The block shape is efficiently machined and easily gripped. The main body 30 can also be formed from a tough plastic material, such as acetal plastic, can be formed by a 3D printer, and can have a variety of shapes. The block 30 has a generally rectangular shape with front, rear, top, bottom and side surfaces 31-35. The generally parallel front and rear surfaces 31 and 32 are perpendicular to the generally parallel top and bottom surfaces 33 and 34. The generally parallel side surfaces 35 are perpendicular to the front, rear, top and bottom surfaces 31-34. The block 30 has a height of about 1.75 inches between top and bottom surfaces 33 and 34, a length of about 1.25 inches between side surfaces 35, and a width of about 1.45 inches between front and rear surfaces 31 and 32. Two container securement holes 37 are drilled into the bottom surface 34. The block or main body 30 has an upper or air intake portion 40 and a lower or chain engaging and cleaning portion 60, which are preferably formed by a single integral piece of material.

Figure 6:
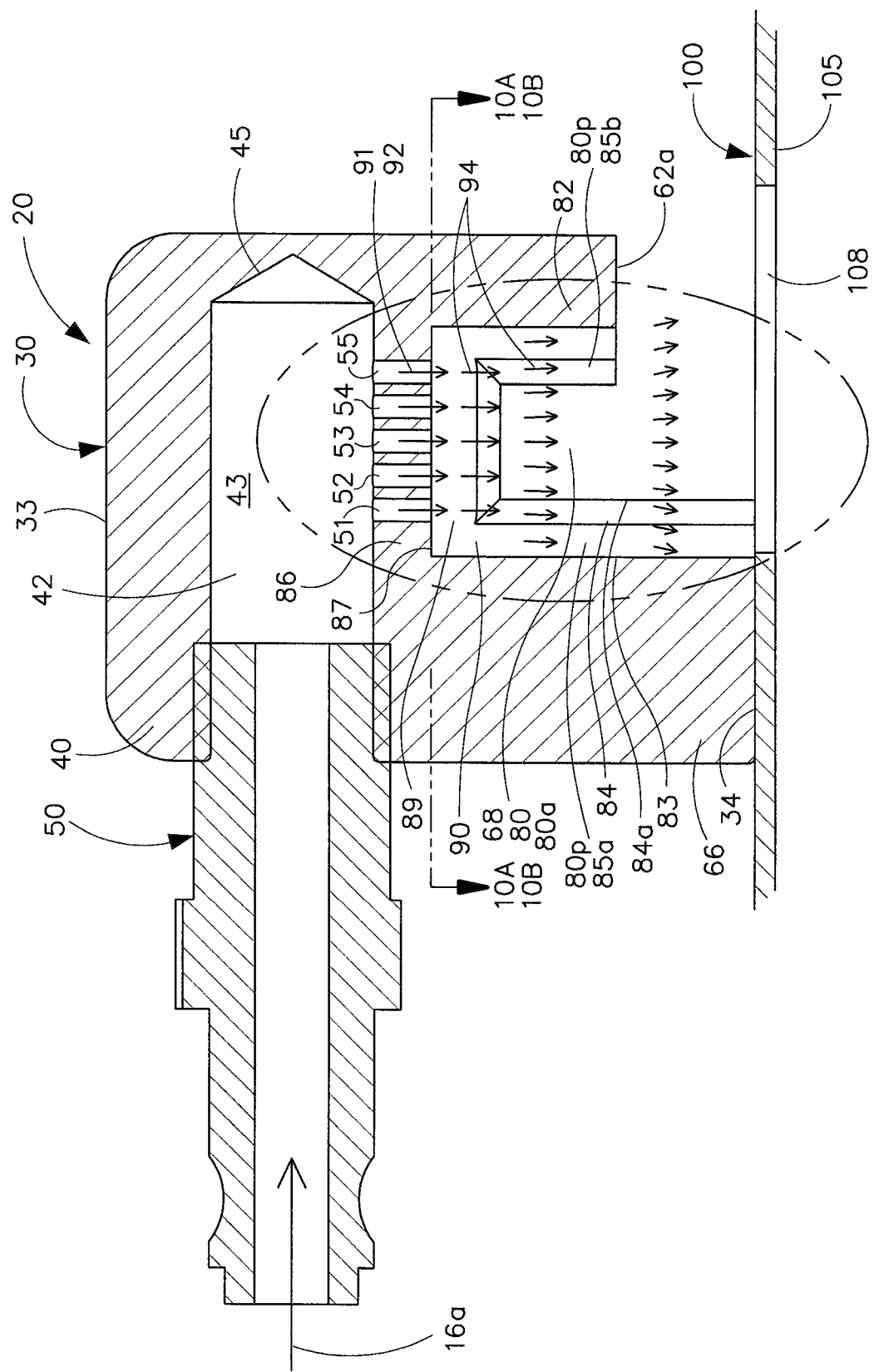
FIG. 6 is a side sectional view of the chain cleaning device showing the air flow through the air distribution and chain aligning block when no chain is present.

The upper portion 40 of the main body 30 forms an air distribution manifold with an air intake channel 42 in pneumatic communication with multiple discharge or cleaning ports 51-55. When machined, the intake channel 42 has a cylindrical side wall 43, and an opening 44 in the front surface 31 and a closed distal end 45. The intake channel 42 spans from the front surface 31 of the main body 30 to proximal its rear surface 32, with the distal end 45 stopping short of the rear surface. The cylindrical wall 43 of the channel 42 has a diameter of about 0.5 inch and a length of about 1.25 inches. The front opening 44 is threaded to pneumatically and sealingly secure one end of the conventional air intake connection 50. The other end of the intake connector 50 is shaped to removably and sealingly secure to the snap-on connector 18. As shown in FIGS. 2 and 6, pressurized supply air 16a is supplied from the compressor 16 to the intake connector 50 via the flexible hose 17 and snap-on connector 18. The pressurized air 16a entering the intake channel 42 via connection 50 exits through the cleaning ports 51-55.

Figure 5G:
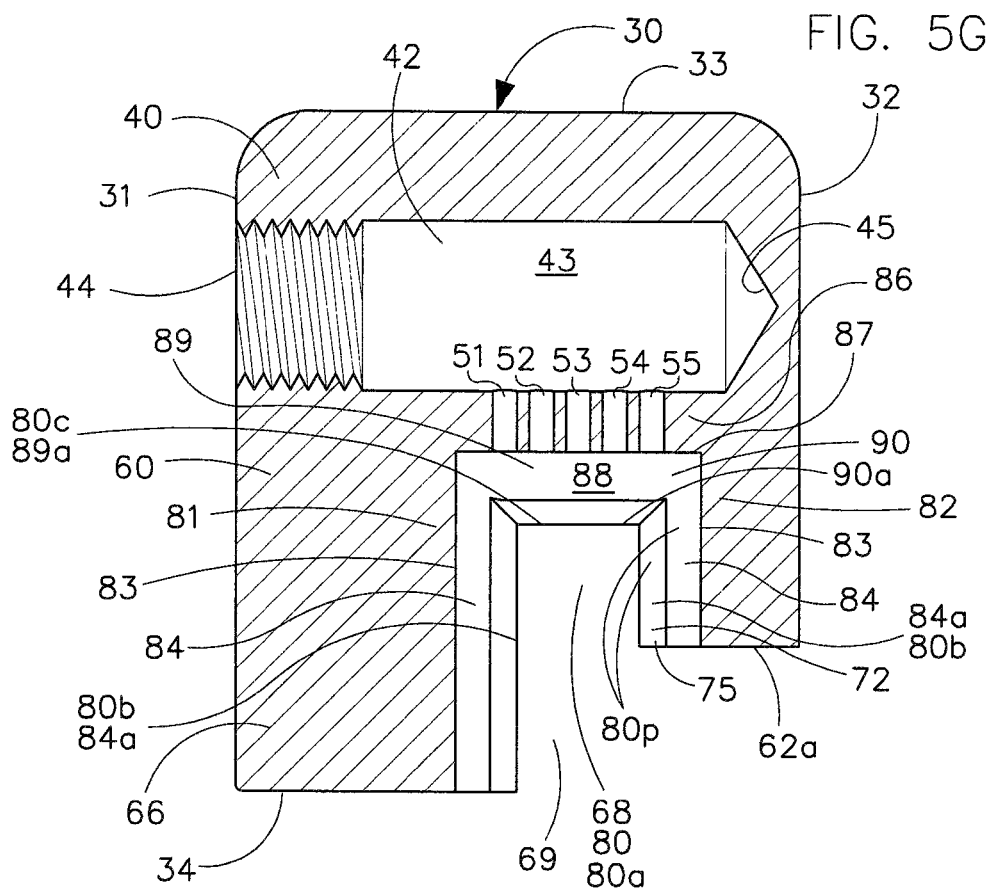
FIG. 5G is a is a sectional view of the air distribution and chain aligning block taken along line 5G-5G of FIG. 5F.

The cleaning ports 51-55 are linearly aligned and uniformly spaced as seen in FIGS. 5F and 5G. The intake channel 42 and the linear alignment of the ports 51-55 are perpendicular or crosswise to the path of travel 14 of the chain 4 through the device 20. Each port 51-55 has a diameter of about 0.06 inches, and the centerline-to-centerline distance between adjacent ports is about 0.09 inches. The pressurized air 16a produced by the conventional compressor 16 is preferably in the range of about 60 to 150 pounds per square inch (psi), and more preferably about 90 psi. When the cleaning device 20 is used with a compressor 16 rated to produce an supply air 16a with a pressure of about 90 psi, the cleaning tool produces a volumetric flow rate of about four standard cubic feet per minute (4 scfm) and an air velocity exiting the cleaning ports 51-55 of about twenty five feet per second (25 ft/s).

While the machined metal embodiment of the main body 30, has linearly aligned ports 51-55 that are parallel to each other and perpendicular to the chain 4 and track 65, it should be understood that the ports can be angled relative to each other, as well as to the track and chain. For example, the port 51 closest to the front 31 of the main body 30 can be angled to point and direct air flow toward the front 31, and the port 55 closest the rear 32 of the main body can be angled to point and direct air flow toward the rear 32 as shown in FIGS. 7A and 7B. In addition, although the preferred machined metal embodiment is shown to include five uniformly spaced ports 51-55, it should be understood that the cleaning device 20 can have fewer or more ports, including a single slit shaped port (FIGS. 8A and 8B) or a combination of round and slit shaped ports (FIGS. 9 and 9A) with the ports producing a working air flow 94 spanning across the top of the chain 4, as discussed below, and provided the air flow through the ports does not exceed the rated volumetric flow rate of the conventional air compressors 16.

When the main body 30 is viewed from the side as in FIGS. 5C and 5G, the lower portion 60 has a longer front wall 61, a shorter rear wall 62 with a lip 62a, and an upper or crosswise track wall 63 to give it a generally hook-shaped construction forming a three-sided track 65 with a downwardly extending leg 66. The track 65 is split into two linearly aligned track portions 65a and 65b. The opening 68 formed by the track 65 has a generally square shape or inverted U-shape with an open lower end. The linear opening 68 has a uniform shape as it extends from one side 35 of the block 30 to the other 35, so that the linear portion 4e of the chain 4 can engage, ride along the surfaces 71-73 of the track 65 in an unobstructed manner. The side track surfaces 71 and 72 and crosswise track surface 73 are generally smooth and flat, but are preferably chamfered or rounded at their inner and outer ends 74 and 75 (FIGS. 5F and 5H) to further facilitate free movement of the chain 4 through the track 65. The track 65 is located proximal the lower 34 rear 32 corner of the block 30. The longer front wall 61 and shorter rear wall 62 have heights of about 11/16 and 5/16 inches, respectively. The upper chain bearing or crosswise wall 63 has a width of about 5/16 inch to accommodate a variety of chain widths as noted above. The three sided, U-shaped track 65 receives and aligns the chain 4 with the cleaning ports 51-55. The downwardly extending leg 66 is formed by the lower portion of the longer front wall 61. The leg 66 combines with the lip 62a of the shorter wall 62 and the container 100 to form an initial chain receiving zone 69 as seen in FIGS. 1, 3, 5G and 6.

The lower portion 60 of the air distribution block also forms a cleaning chamber 80 as best seen in FIGS. 4, 5F, 5G and 6. The chain track 65 allows successive chain links 5 to continuously progress through the cleaning chamber 80 and pass below discharge ports 51-55. The bicycle chain 4 can remain looped around its sprockets 11, with the chain moving through the device 20 along a linear path of travel 14 by rotating the bicycle pedal 12 as in FIG. 2. Although the chain 4 is shown moving in one direction through the device 20, it should be understood that the chain can move in the reverse direction through the device.

Figure 5H:
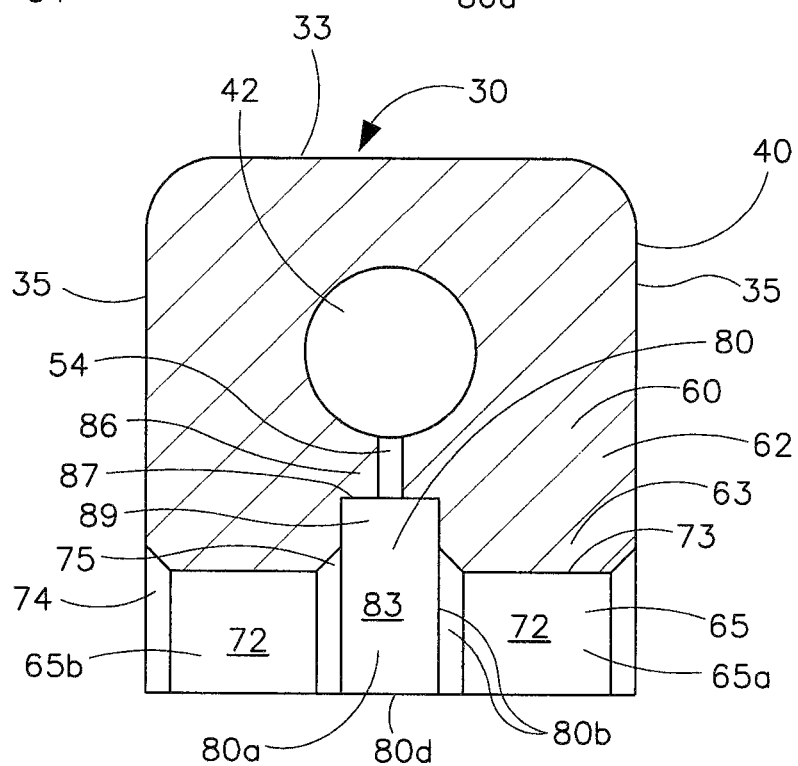
FIG. 5H is a sectional view of the air distribution and chain aligning block taken along line 5H-5H of FIG. 5F.

The chamber 80 has a central zone 80a through which the chain 4 passes. The perimeter of the generally square shape or inverted U-shape of the track opening 68 defines the perimeter of the central chamber zone 80a. The width of the track 65 defines the front and rear lateral sides 80b and width of the central zone 80a as seen in FIGS. 5C, 5G and 5H. The upper or crosswise surface 73 of the track 65 defines the top end 80c of the central zone 80a. The lip 62a of the rear track wall 62 preferably defines the bottom end 80d of the central zone 80a. The length of the central zone 80a is defined by the chamfered inside ends 75 of the track 65. No walls form the central chamber zone 80a. The entire perimeter 80b, 80c and 80d of the central zone 80a is open. The lateral sides 80b are open to lateral side pathway portions 80p. The top end 80c is open to crosswise compartment 89. The bottom end 8d is open to receive the chain 4. The track 65 and its walls 61-63 and surfaces 71-73 form a chain aligning mechanism that aligns the chain 4 with the cleaning chamber 80, and more particularly that aligns the chain width within the width of the central chamber zone 80a and the chain height within the height of the chamber zone 80a. Still, given the track 65 and chamber 80 have an inverted U-shape with open lower sides, an extra tall chain (not shown) with a height greater than the track height can pass through the track and central chamber zone 80a, but the lower portion of the extra tall chain may not be cleaned as thoroughly by the device 20.

Figure 3:
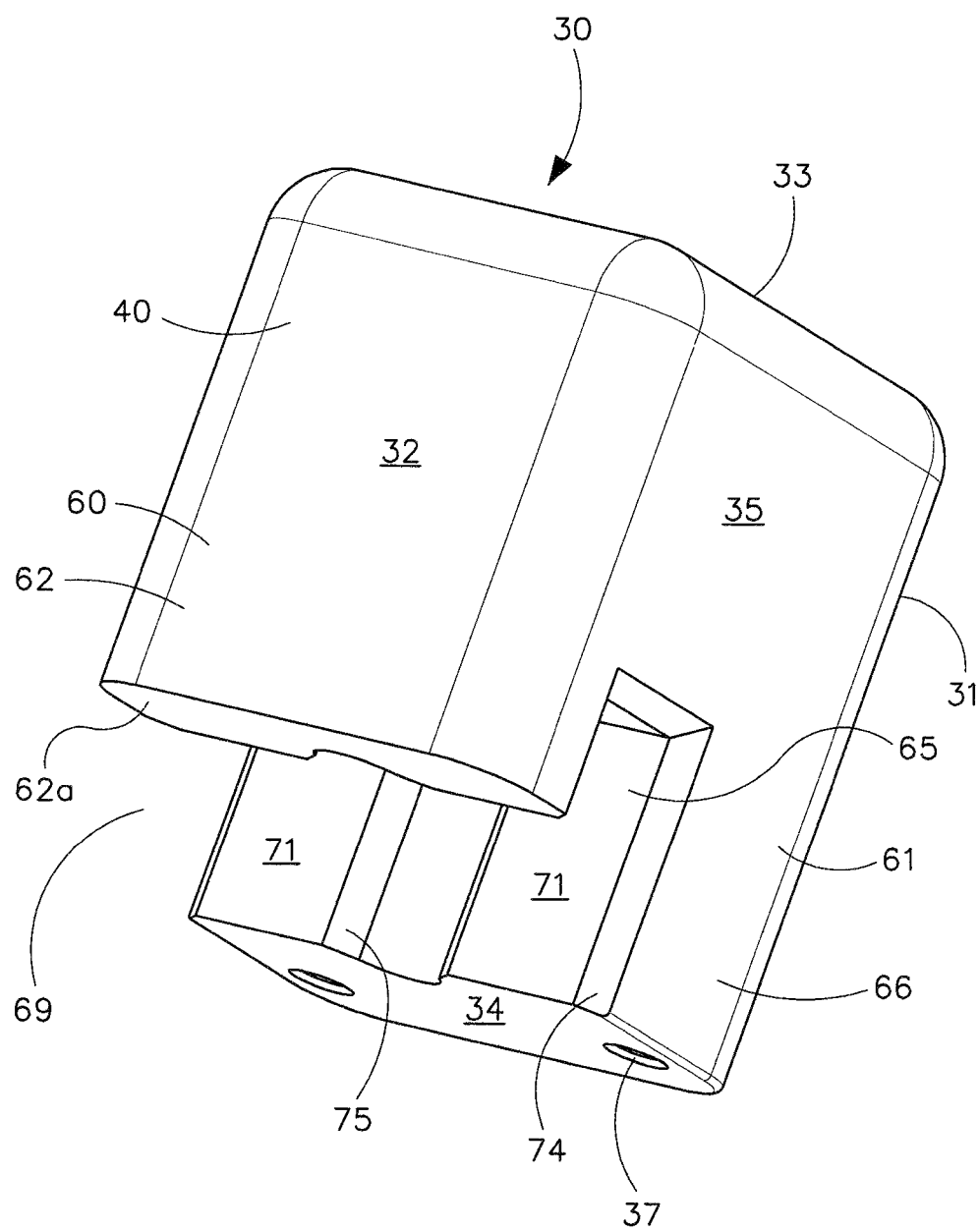
FIG. 3 is a side perspective view of the preferred embodiment of the air distribution and chain aligning block or main body of the chain cleaning device.
Figure 4:
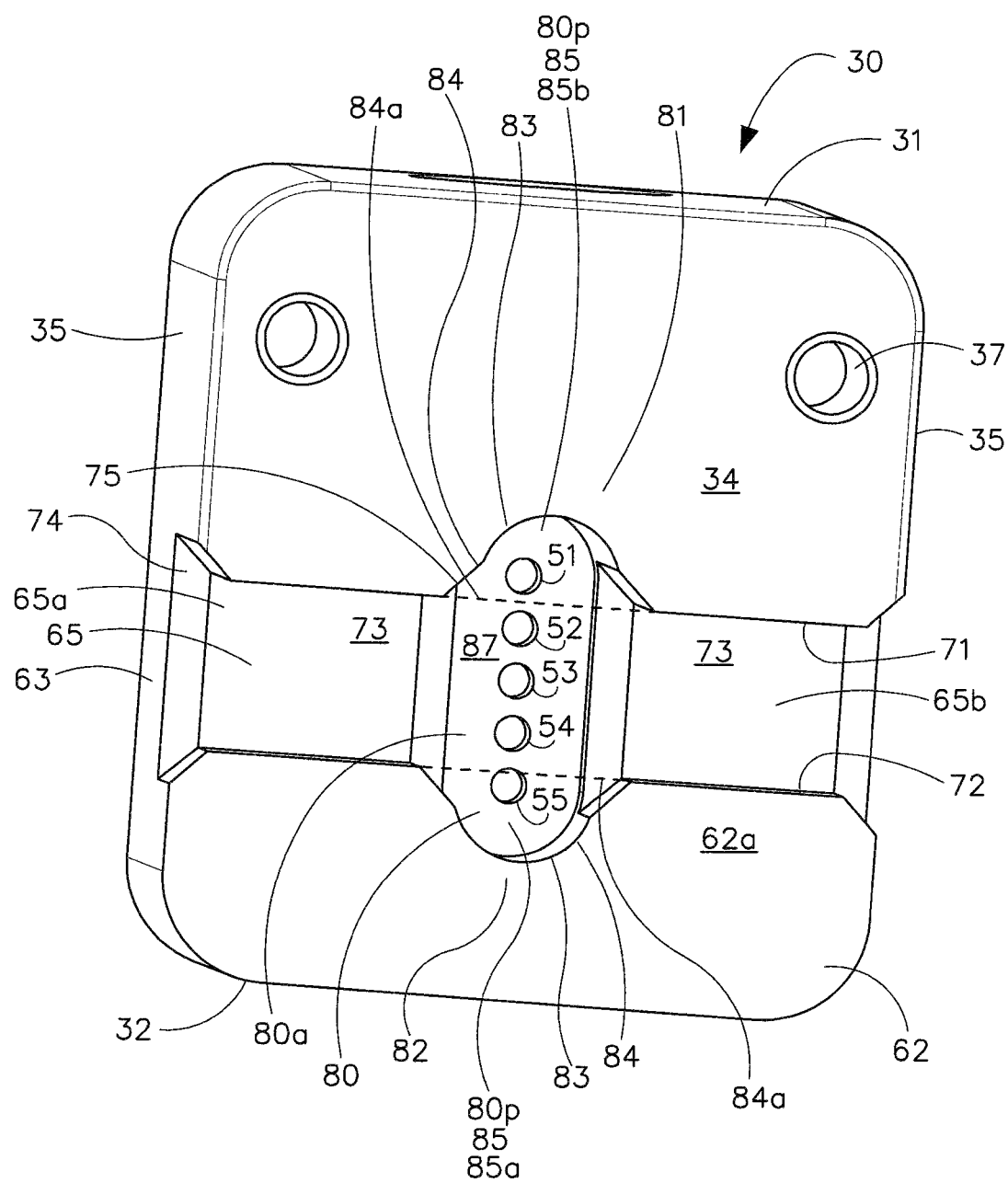
FIG. 4 is a bottom perspective view of the air distribution block showing its chain track, cleaning chamber with five discharge ports, and fastener openings for attaching the container lid.
Figure 11A:
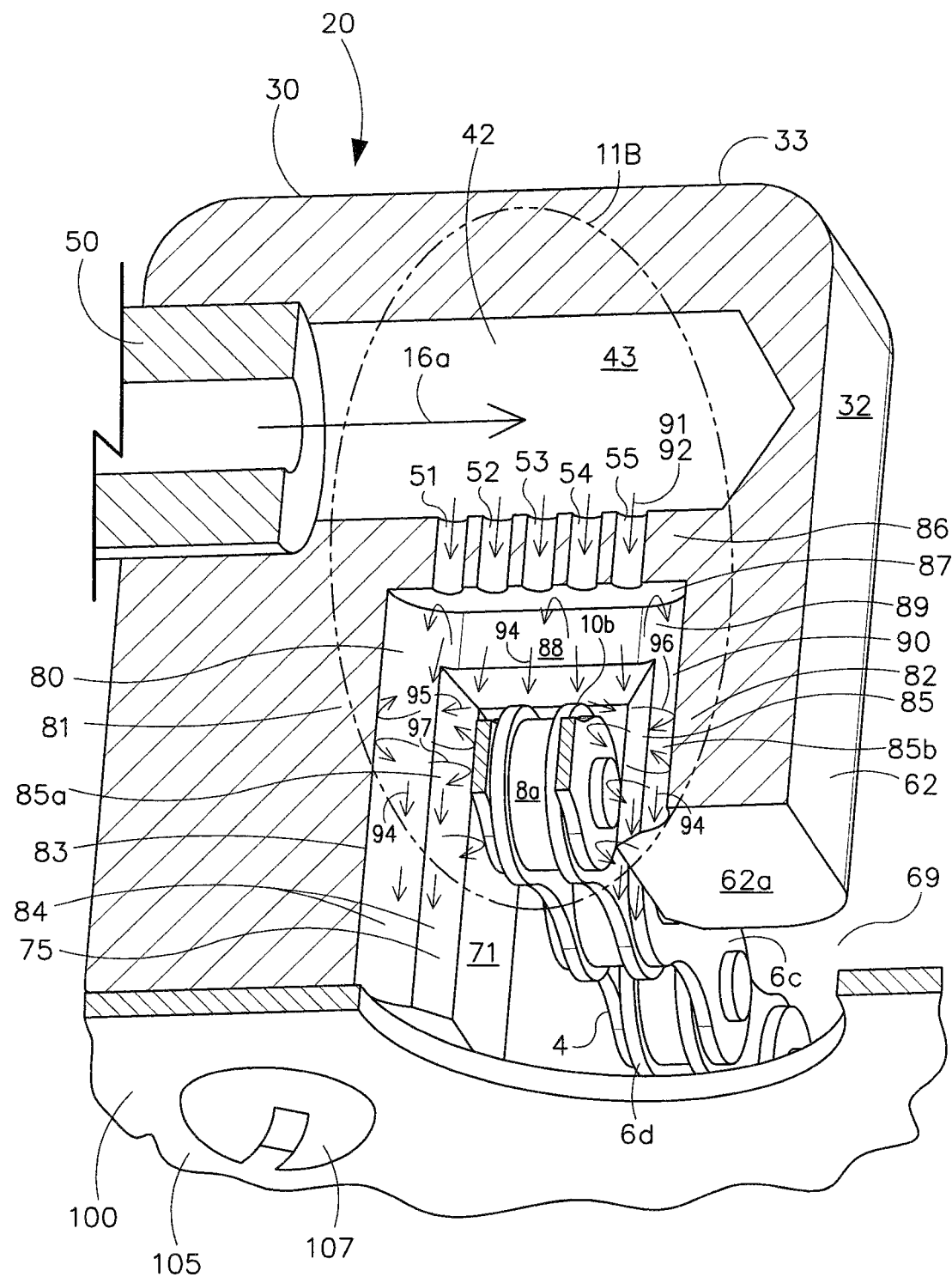
FIG. 11A is a partial side sectional view of the cleaning device showing the chain plates, pin and roller (closed chain profile) aligned under the discharge ports, and the working air flow striking the upwardly facing surfaces of the chain and the working and swirling air flows progressing through the front and rear pathways and along the outside surfaces of the plates to remove dirt, grease, grit and grim from the surfaces of the chain.

When positioning the cleaning device 20 around the chain 4, the chain enters the receiving zone 69 formed between the container 100, rear wall lip 62a and front wall leg 66 as best seen in FIGS. 3, 6 and 11A. The chain abuts the lower portion 66 of the front wall 61, and then slides up that wall 61 and into the inverted U-shaped track opening 68. The chain 4 remains engaged in the track 65 during its cleaning. The length of the front wall 61 and its downwardly extending portion 66 help keep the chain 4 from inadvertently moving out of the track 65 during use. The depth of the track 65 is defined by the height of the shorter rear wall 64. The width of the track 65 is defined by width of the upper chain bearing wall or crosswise track wall 63, which is about 5/16 or 0.3 inches wide to accommodate common bicycle chains. The opening 68 formed by the track 65 intersects and passes through the cleaning chamber 80.

The cleaning chamber 80 is formed into the lower portion 60 of the main body 30 as shown in FIGS. 4, 5F-5G and 6. The cleaning chamber or cleaning zone 80 is located at or near the middle of the block 30 between track portions 65a and 65b. The chamber 80 is formed by front and rear walls 81 and 82 and a ceiling wall 86. Each port 51-55 forms an air passage from the air intake channel 42, through the ceiling wall or crosswise chamber wall 86 and into the cleaning chamber 80. The height of the front chamber wall 81 is about 11/16 inches, which equals the length of its integral front track wall 61. Similarly, the height of the rear chamber wall 82 is about 5/16 inches, which equals the length of its integral rear track wall 62. The front, rear and ceiling chamber walls 81, 82 and 86 surround three sides of the chain 4 as it moves through the chamber 80. The chamber 80 has a compact size and shape. The chamber 80 is wider that it is long. The length of the central portion 80a of the chamber 80 between its side walls 88 is about ¼ inch (0.25 inch, 6.4 mm), which is about half the length of the links 5 forming the chain 4. The total length of the chamber 80 is increased a bit by the chamfering of the inner ends 75 of the track 65. The width of the chamber 80 is greater than the width of the track 65, and is preferably about ⅜ inch (0.6 inch, 15 mm) wide along its central or widest axis between the opposed recessed lateral surfaces 83 of front and rear walls 81 and 82, which is about twice the width of the chain 4 and track 65. The central discharge ports 52-54 are located above the central portion 80a of the chamber 80. The outer discharge ports 51 and 55 are located above the open front and rear lateral side portions 80p of the chamber 80 proximal the front and rear chamber walls 81 and 82.

When a chain 4 is moving through the central portion 80a of the chamber 80, the open front and rear lateral side portions 80p of the chamber 80 form front and rear lateral pathways 85 as shown in FIGS. 10A-11B. The relatively narrow pathways 85 extend along the outer lateral side plate surfaces 6c of the chain 4. An outer discharge port 51 or 55 is located directly above each pathway 85a and 85b. The lateral pathways 85 ensure air flow around both chain sides 4c, particularly when the chain 4 approaches the width of the track 65. Each of the recessed lateral surfaces 83 of the front and rear chamber walls 81 and 82 has opposed inwardly extending lateral surfaces 84 that define the width of an open inner lateral side 84*a*. This open inner lateral side 84*a* of each chamber pathway 85*a* and 85*b* faces the outer side plate surface 6*c* of the chain 4.

The relatively narrow lateral side pathways 85 of the chamber 80 are confined by recessed lateral wall surface 83 and opposed inwardly extending lateral surfaces 84 to maintain the air flow in the lateral pathways against the outer lateral side plate surfaces 6*c* of the chain 4. The recessed surface 83 of the front wall 81 is outwardly offset from the front track wall surface 71, and the recessed surface 83 of the rear wall 81 is outwardly offset from the rear track wall surface 72, so that the width of the chamber 80 is greater than the width of the track 65, but only to a desired small amount needed to obtain proper air flow through the front and rear pathways 85 while maintaining that air flow against the outer side surface 6*c* of the chain 4. The amount of the chamber surface 83 offset is preferably about 0.15 inches from its corresponding track side surface 71 or 72, at the widest part of the chamber 80, so that the outer lateral side surfaces 6*c* or front and rear sides 4*c* of the chain 4 remain within about one chain width from its corresponding front or rear recessed chamber surface 83. The chamber surfaces 83 and 84 are preferably rounded or convex, which can help direct the flow of air into the outer side surfaces 6*c* of the chain 4 as discussed below.

The raised ceiling wall 86 has a flat upper surface 87. The raised ceiling or crosswise chamber wall 86 extends deeper into the main body or block 30 than the upper or crosswise track wall 63, and defines opposed downwardly or inwardly extending crosswise surfaces 88 as best seen in FIGS. 5G and 5H. The ceiling surface or elevated crosswise surface 87 is upwardly elevated a distance of preferably about 0.2 inches from the crosswise track surface 73 and the top or crosswise chain surface 4*a* or upwardly facing chain surfaces 10. The raised ceiling or crosswise chamber wall 86 creates a crosswise compartment or air dispersion pocket 89 immediately below discharge ports 51-55. The chamber 89 and its opposed inwardly extending crosswise surfaces 88 form an open inner crosswise side 89*a*. The open inner crosswise side 89*a* is positioned over and leads into the central chain receiving zone 80*a* of the chamber 80. This crosswise compartment 89 forms an air flow pathway located between the ceiling surface 87 and the top end 80*c* of the chain receiving zone 80*a*, which is planar to the upper or crosswise track surface 73. The crosswise compartment 89 spaces the exit openings of the discharge ports 51-55 from the upwardly facing surfaces 10 of the chain 4.

The ceiling or crosswise compartment 89 merges with the lateral pathways 85 when the chain 4 is moving through the cleaning chamber 80. The chamber ceiling 86 spans from the front chamber wall 61 to the rear chamber wall 62. The offset or recessed lateral surfaces 83, opposed inwardly extending lateral surfaces 84 and open inner lateral side 84*a* of the front and rear chamber walls 81 and 82 extend vertically the height of the track 65 and meet the generally horizontal ceiling surface 87. The front and rear ends of the dispersion compartment 89 are formed by the uppermost portions of recessed lateral surfaces 83 of the chamber 80, so that the crosswise pathway 89 merges with the front and rear lateral pathways 85. Together, pathways 85*a*, 85*b* and 89 form a horseshoe shaped or U-shaped continuous pathway 90 around the three sided perimeter of the cleaning chamber 80 and along the top or crosswise chain surface 4*a* and opposed lateral side chain surfaces 4*b*. The open inner sides 84*a* and 89*a* also merge, so that the continuous pathway 90 has a U-shaped, continuously open inner side 90*a* facing three sides of the chain 4. The chain 4 passing through the central chamber zone 80*a* is engulfed in and closely surrounded on three sides by the air flowing from the discharge ports 51-55 into the central portion 80*a* of the chamber 80, as well as by the outer lateral chamber portions 80*p* or pathways 85*a* and 85*b* of the continuous horseshoe or U-shaped pathway 90. The lateral pathways 85 allow air from the discharge ports 51-55 to flow along both outer lateral side plate surfaces 6*c* of the chain 4, even when one side of the chain is engaging and riding along the front or rear track wall 61 or 62.

During operation, pressurized air from the compressor 16 and its hose 17 flows into the intake connector 50, through channel 52 and out discharge ports 51-55 as shown in FIG. 6. Air streams or jets 91 of high velocity air (25 ft/s) emanate from the cleaning ports 51-55. The streams 91 are aimed to flow along a flow path 92 directed into and through the air dispersion compartment 89 of cleaning chamber 80. The jets 91 have an initially conical shape that widens or expands as it progresses further from its discharge port 51-55. The linearly aligned ports 51-55 and conical air streams 91 are close enough together that they merge to form a high velocity, working air flow 94 spanning across the width of the cleaning chamber 80. The width of the working streams or flow 94 is greater than the width of the track 65, and spans beyond the side plates 6 of the chain 4 moving through the track. The conical air streams 91 are believed to merge together in the dispersion pocket 89 to form the working air flow 94 before striking the upwardly facing surfaces 10 of the chain 4. The working air flow or stream 94 preferably spans the width of the cleaning chamber 80. When no chain 4 is present, the working or cleaning air flow 94 is directed along its flow path 92 straight down through the cleaning chamber 80.

Figure 11B:
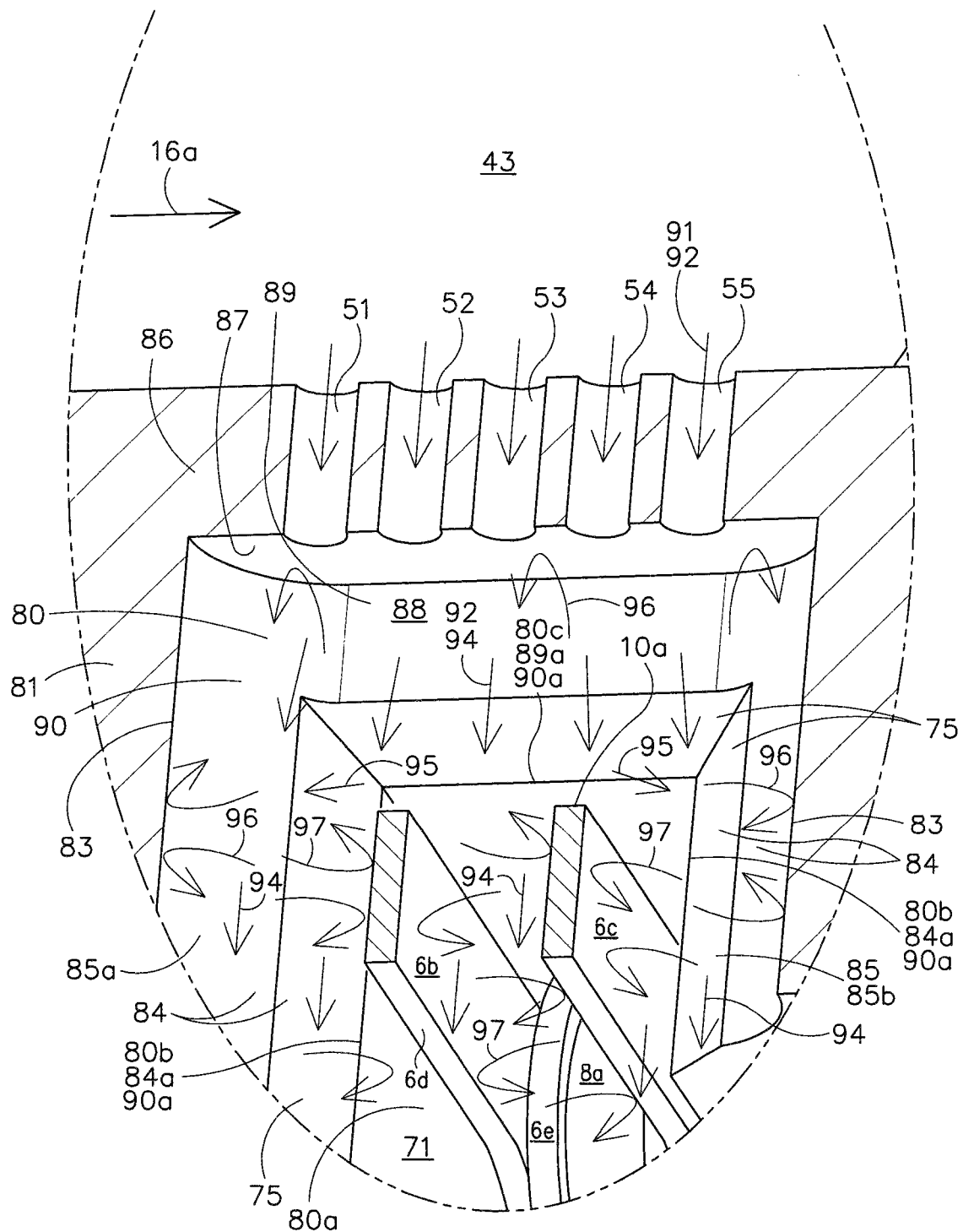
FIG. 11B is an enlarged view of FIG. 11A showing the chain plats and its internal opening (open chain profile) aligned under the discharge ports, and working air flow striking the upwardly facing surfaces of the chain and the working and swirling air flows progressing through the interior of the chain and the front and rear pathways along the outside surfaces of the plates to remove dirt, grease, grit and grim from the surfaces of the chain.

When the multi-surface chain 4 is in the central portion 80*a* of the cleaning chamber 80, the conical 91 or working air streams 94 strike the upwardly facing surfaces 10 of the chain 4 to blast or otherwise remove dirt, grease, grit, grime and debris from its upwardly facing surfaces. The upwardly facing surfaces 10 of the chain 4 deflect the conical 91 or working air streams 94 outward to form deflected air streams 95 as shown in FIGS. 10A and 10B in a manner believed to be similar to that of a water stream from a garden hose striking a wall and spraying outwardly in 360 degrees relative the stream. Yet, the deflected working flows 95 are confined by the compact structure of the chamber 80 and its surfaces 83, 84, 87 and 88 as well as the presence of the chain 4. Many of the deflected air flows 95 strike these wall surfaces 83, 84, 87 and 88, and are redirected in the form of redirected air flows 96 back at the multi-surface chain 4 from a multitude of different directions. Given the chain 4 is crowding the confined space of the chamber 80, some of the deflected air streams 96 strike the chain 4 again before striking the wall surfaces, particularly the chain inside surface 6*b* between its plates 6. Due to the confined space of the compact chamber 80, this process is believe to be repeated again and again as the working stream 94, deflected working streams 95 and redirected working streams 96 progress in a turbulent or swirling airflow 97 down the chamber 80 between its front and rear walls 81 and 82 as shown in FIGS. 11A and 11B.

The continuous pathway 90 allows a constant flow of the high velocity air streams 91 from the discharge ports 51-55 when either the open profile 10*a* or closed profile 10*b* of the chain 4 is aligned under the ports. The horseshoe shaped pathway 90 allows the high velocity working air flow 94 from the central discharge ports 52-54 to flow into the front and rear lateral pathways 85*a* and 85*b* when the chain 4 restricts or blocks the flow of air through the central portion 80*a* of the chamber 80. When a chain link 5 is aligned in the chamber so that the discharge ports 51-55 are directly over the side plates 6 and open interior 9 between them (more open profile 10*a* in FIGS. 10A and 11B), much of the air flow progresses through the central portion 80*a* of the chamber 80 and the inside 9 of the chain 4. When the ends of two adjacent chain links 5 are aligned in the chamber 80 so that the central discharge ports 52-54 are over the chain plates 6, pins 7, rollers 8 and (more closed profile 10*b* in FIGS. 10B and 11A), less air flow passes through the central portion 80*a* of the chamber 80 and inside 9 of the chain 4, and the diverted air flow 95 passes through side pathways 85*a* and 85*b* so that the volumetric air flow through the discharge ports 51-55 remains relatively constant.

The surging high velocity working and swirling air flow 94-97 through the lateral pathways 85 improve the ability of the device 20 to efficiently clean the outside surfaces 4*c* of the chain 4. When the closed chain profile 10*b* (plates 6, pin 7 and roller 8) is aligned directly under the central discharge ports 52-54, the working air flow from these central ports strikes the upwardly facing surfaces 10 (surfaces 6*a*, 7*a* and 8*a* of the plates 6 pin 7 and roller 8) to generate a larger amount of deflected 95, redirected 96 and turbulent or swirling 97 high velocity air flows that enter the side pathways 85 along with the high velocity working air flows from side ports 51 and 55. This generates a pulsing surge of air flow 94-97 through the lateral pathways 85 to even more effectively remove dirt, grease, grit and grim from the side surfaces 4*c*, 6*c* of the chain 4.

The chain cleaning device 20 fluctuates between pulsating air flows and more steady state air flows inside the cleaning chamber 80 depending on the speed of the chain 4. When the central discharge ports 52-54 are aligned over a chain link 5 opening 9, the more open chain profile 10*a* for its upwardly facing surfaces 10 is smaller, so that the air flow pattern along the interior and outer chain surfaces is believed to be more dominated by its downward conical and working air flows 91, 94, but still include some turbulent swirling air flows 95-97. When the central discharge ports 52-54 are aligned directly over a pin 7 and roller 8 connecting two links 5, the more closed chain profile 10*b* for its upwardly facing surfaces 10 is larger, so that the air flow pattern is believed to be more dominated by the turbulent swirling air flow 95-97. As each link 5, passes by the discharge ports 51-55, the airflow pattern fluctuates. Turning the bicycle pedal 12 slowly, moderately or quickly is believed to alter the air flow pattern in the cleaning chamber 80. A slow moving chain 4 results in a pulsating air flow pattern fluctuating between more and less turbulent swirling air flows 95-97. A fast moving chain 4 tends is believed to generate a more constant or steady state high velocity swirling air flow 95-97. A fast moving chain 4 also increases the cleaning power of the device on the leading surfaces of the chain as it moves through the cleaning chamber 80.

As the high velocity working and turbulent or swirling air flows 94-97 progresses along the surfaces of the plates 6 and around the pins 7 and rollers 8 of the chain 4 as shown in FIGS. 11A and 11B, these air flows clean away dirt, grease, grit and grime 15 on the many differently oriented surfaces 6*a-e*, 7*a* and 8*a* of the chain 4. The limited volume of the chamber 80 and the close proximity of its ceiling and walls 81, 82 and 86 to the chain 4 direct the air flows 94-97 back toward the chain 4 so that they hit the variously oriented and angled surfaces at high degrees of angle. The size of the cleaning chamber 80 and its pathways 85, 89 and 90 are kept relatively compact so that the working and swirling air flows 94-97 remain at high velocity and are concentrated on the chain plates 6, pins 7 and rollers 8, and are redirected back at those surfaces as the combined forces of the working and swirling streams 94-97 progress down through the cleaning chamber 80.

A debris container 100 is secured to the main body 30 below the cleaning ports 51-55, cleaning chamber 80 and chain alignment zone 69 as seen in FIGS. 1, 2, 3 and 11A. Debris 15 removed from the chain 4 by the working and swirling air flows 94-97 is collected in a container 100. The container 100 has a lid 105. The lid 105 is secured to the bottom 34 of the cleaning block 30 via screw fasteners 107 received by the block securement holes 37 as shown in FIGS. 5F and 11A. The lid 105 has an opening 108 aligned with the cleaning chamber 80. The opening 108 is wide enough to allow the debris removed from the chain 4 and carried by the working and swirling air flows 94-97 to pass through the opening 108 and into the container 100. A debris collector or air baffle (not shown) is placed inside the contain 100 to prevent the debris from blowing back out the lid opening 108.

No liquids or solvents are used during the operation of the device 20. A mild degreaser is preferably applied to the chain 4 and removed with a brushed or towel prior to the use of the device 20. Any previously applied solvent remaining on the chain 4 is blown off by the device.

While the invention has been described with reference to a preferred embodiment, it will be understood by those skilled in the art that various changes may be made and equivalents may be substituted without departing from the broader aspects of the invention. For example, while the present invention has been discussed for cleaning a bicycle chain, the invention could be adapted to clean drive chains for other types of vehicles and tools, such as motorcycles, garage door openers and chain saws.

I claim:

1. A chain cleaning device used with a source of pressurized gas to clean dirt, grease, grit and grime from a multi-surface chain with a chain width, a chain height and a plurality of links, each link having side plates, pins, rollers, an open link interior and various differently oriented chain surfaces including a crosswise chain surface and opposed outer side plate surfaces, said chain cleaning device comprising:
   a main body forming a gas intake channel and a cleaning chamber;
   said gas intake channel being in pneumatic communication with the source of pressurized gas and at least one discharge port, said discharge port discharging a working flow of the gas into said cleaning chamber;
   said cleaning chamber having front and rear chamber walls with recessed lateral surfaces and opposed inwardly extending surfaces, and a raised ceiling forming a crosswise compartment with opposed crosswise surfaces, said front and rear chamber walls and said opposed inwardly extending surfaces forming front and rear lateral pathways when the chain is in said chamber, said crosswise compartment configured to span the chain width and said lateral pathways configured to span the chain height to surround the chain on three sides, said crosswise compartment having an open inner crosswise side configured to face the crosswise chain surface, each of said lateral pathways having an open inner lateral side configured to face one of the outer side plate surfaces, said at least one discharge port discharging said working flow into said crosswise compartment along a flow path directed at the crosswise chain surface, said working flow passing through the open link interior and said lateral pathways, said recessed lateral surfaces and said opposed inwardly extending surfaces of said front and rear chamber walls configured to maintain the working flows in said lateral pathways in engagement with the outer side plate surfaces of the chain; and, wherein said working flow strikes the various differently oriented chain surfaced to clean away the dirt, grease, grit and grime from the multi-surface chain.

2. The chain cleaning device of claim 1, and wherein said working flow is a high velocity working flow, and said high velocity working flow strikes the chain surfaces facing said flow path to generate high velocity swirling flows, said chamber and said front and rear chamber walls being configured to maintain said working and swirling flows against the chain surfaces including the outer side plate surfaces, and said high velocity working and swirling flows striking the various differently oriented chain surfaced from a multitude of directions to clean away the dirt, grease, grit and grime from the multi-surface chain.

3. The chain cleaning device of claim 1, and wherein said crosswise compartment and said lateral pathways form a continuous pathway around three sides of the chain, said continuous pathway having an open inner side facing three sides of the chain.

4. The chain cleaning device of claim 3, and wherein said crosswise compartment has a compartment width and said working flow has a working flow width, said compartment width and said working flow width extending beyond the outer side plate surfaces of the chain.

5. The chain cleaning device of claim 4, and wherein and said main body forms a chain track, said chain track having a crosswise track wall, a front track wall and a rear track wall, said track walls aligning the chain with said cleaning chamber.

6. The chain cleaning device of claim 5, and wherein said cleaning chamber has a central zone and lateral zone sides, said track walls being configured to align the chain within said central zone, and said lateral zone sides forming said lateral pathways when the chain passes through said central zone.

7. The chain cleaning device of claim 6, and wherein the outer side plate surface of the front side of the chain remains within about one chain width of said front chamber wall, and the outer side plate surface of the rear side of the chain remains within about one chain width of said rear chamber wall.

8. The chain cleaning device of claim 6, and wherein said at least one discharge port is a plurality of discharge ports aligned between said front and rear chamber walls.

9. The chain cleaning device of claim 8, and wherein said discharge ports are uniformly spaced in linear alignment and aimed perpendicular to said chain track, and wherein one of said discharge ports is aligned directly over said front pathway, and one of said discharge ports is aligned directly over said rear pathway.

10. The chain cleaning device of claim 9, and wherein the chain has a width of about 0.31 inches, said plurality of discharge ports are five discharge ports, each said discharge port has a diameter of about 0.03 inches, said chamber has a ceiling that is upwardly offset from said crosswise track wall about 0.2 inches, said front chamber wall has a recessed lateral surface that is outwardly recessed from said front track wall about 0.15 inches, and said rear chamber wall has a recessed lateral surface that is outwardly recessed from said rear track wall about 0.15 inches.

11. The chain cleaning device of claim 10, and wherein the pressurized gas is pressurized air.

12. The chain cleaning device of claim 11, and wherein the source of pressure is at least about 90 psi, and said working flow is a high velocity working flow with a velocity of at least about 25 ft/sec when exiting said discharge ports.

13. The chain cleaning device of claim 6, and wherein said main body has upper and lower portions, said chain track is located on said lower portion, said crosswise track wall is an upper track wall, and said lower portion includes a downwardly extending leg to form a chain receiving zone.

14. The chain cleaning device of claim 13, and further comprising a container secured to said downwardly extending leg, said container having an opening and an interior, said opening being aligned with said flow path and below said chain receiving zone, and wherein the dirt, grease, grit and grime removed from the chain are collected in said container.

15. The chain cleaning device of claim 14, and further comprising a gas intake connector securely and pneumatically connected to said gas intake channel, said intake connector being adapted to removably join intake channel to the source of pressure.

16. The chain cleaning device of claim 5, and wherein said chain track is formed by first and second linearly aligned track portions, and said cleaning chamber is located between said first and second linearly aligned track portions.

17. The chain cleaning device of claim 5, and wherein said front chamber wall is integral to said front track wall, and said rear chamber wall is integral to said rear track wall.

18. The chain cleaning device of claim 17, and wherein said main body is an integral piece of material.

19. The chain cleaning device of claim 18, and wherein said main body has a block shape with front, rear, top and side surfaces, said top surface is normal to said front, rear and side surfaces, and said crosswise track wall is parallel to said top surface and perpendicular to said cleaning chamber.

20. The chain cleaning device of claim 4, and wherein the chain has repeating open and closed profiles that pass by said working flow as the chain moves along a path of travel through said cleaning chamber, and said working flow generates surging flows through said front and rear pathways.

21. The chain cleaning device of claim 1, and wherein said opposed inwardly extending crosswise surfaces form said open inner crosswise side of said crosswise compartment, and said opposed inwardly extending surfaces of each of said front and rear chamber walls form said open inner lateral sides of said lateral pathways.

22. The chain cleaning device of claim 1, and wherein the chain is a bicycle chain.

23. The chain cleaning device of claim 22, and wherein the bicycle chain is a chain loop having a linear portion between first and second sprockets of the bicycle, and the linear portion is driven by a peddle along a chain path of travel through said cleaning device.

24. A chain cleaning device used with a source of pressurized gas to clean dirt, grease, grit and grime from a multi-surface chain with a chain width, a chain height and a plurality of links, each link having side plates, pins, rollers and an open link interior with various differently oriented chain surfaces including opposed outer side plate surfaces and inner surfaces, said chain cleaning device comprising:

a main body forming a gas intake channel, a cleaning chamber and a chain alignment mechanism;

said gas intake channel being in pneumatic communication with the source of pressurized gas and at least one discharge port, said at least one discharge port discharging a high velocity working flow of the gas into said cleaning chamber, said high velocity working flow having a working flow width;

said cleaning chamber having a side, front and rear chamber walls and a raised ceiling with opposed crosswise surfaces to form a crosswise compartment, the chain passing between said front and rear chamber walls and said chamber configured to enclose the chain on three sides, said at least one discharge port discharging said high velocity working flow along a flow path crossing the chain width, said working flow width configured to span the chain width, said flow path passing through the open link interior, each of said front and rear chamber walls having a recessed surface with opposed inwardly extending surfaces to form front and rear pathways, each of said pathways receiving said working flow and each of said pathways having an open inner side configured to face one of the outer side plate surfaces of the chain, said pathways and said open inner sides configured to span the chain height, and said recessed lateral surface and said opposed inwardly extending surfaces of each of said front and rear chamber walls configured to maintain the working flow in its said pathway in engagement with the outer side plate surfaces of the chain;

said chain aligning mechanism positioned to said side of said cleaning chamber, said aligning mechanism having an alignment surface in planar alignment with said open inner side of one of said pathways to align the chain with said cleaning chamber; and, wherein said working flows strike the various differently oriented chain surfaces to clean away the dirt, grease, grit and grime from the multi-surface chain.

25. The chain cleaning device of claim 24, and wherein said high velocity working flow strikes the chain surfaces facing said flow path to generate high velocity swirling flows, said chamber and said front and rear chamber walls being configured to maintain said working and swirling flows against the chain surfaces including the outer side plate surfaces, and said high velocity working and swirling flows striking the various differently oriented chain surfaced from a multitude of directions to clean away the dirt, grease, grit and grime from the multi-surface chain.

26. The chain cleaning device of claim 24, and wherein said cleaning chamber has an offset ceiling spacing said at least one discharge port from the chain.

27. The chain cleaning device of claim 26, and wherein said offset ceiling forms a compartment that merges with said front and rear pathways to form a continuous pathway extending around three sides of the chain.

28. The chain cleaning device of claim 27, and wherein and said main body includes a chain track, said chain track forming said chain alignment mechanism, said track having a crosswise track wall and spaced front and rear track walls.

29. The chain cleaning device of claim 28, and wherein said cleaning chamber has a central compartment zone and side compartment zones, said central compartment zone having a compartment zone width and a compartment zone height, said chain track being configured to align the chain width within said compartment zone width and the chain height within said compartment zone height, and said side compartment zones forming said lateral pathways when the chain is in said cleaning chamber.

* * * * *